(12) United States Patent
Fujii et al.

(10) Patent No.: US 6,528,919 B2
(45) Date of Patent: Mar. 4, 2003

(54) BRUSHLESS MOTOR HAVING WATER DRAINING PORTION

(75) Inventors: Yoshikazu Fujii, Toyohashi (JP); Masumi Tsuchida, Toyokawa (JP); Kazuhiro Miyazawa, Anjo (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/874,317

(22) Filed: Jun. 6, 2001

(65) Prior Publication Data

US 2001/0052733 A1 Dec. 20, 2001

(30) Foreign Application Priority Data

Jun. 12, 2000 (JP) ......................................... 2000-175152

(51) Int. Cl.[7] .............................. H02K 5/20; H02K 5/10; H02K 7/00
(52) U.S. Cl. ............................. 310/88; 310/89; 310/52; 310/58; 310/59
(58) Field of Search .............................. 310/88, 89, 59, 310/52, 58, 62, 63, 64, 60 A, 67 R (56) References Cited

U.S. PATENT DOCUMENTS 3,751,699 A * 8/1973 Gleichman ..................... 184/6
5,077,503 A * 12/1991 Tamura et al. ................. 310/88
6,107,708 A * 8/2000 Yamaguchi et al. ........... 310/58

FOREIGN PATENT DOCUMENTS

| JP | A-6-84771 | 12/1994 |
| JP | A-11-332203 | 11/1999 |
| JP | A-2000-316247 | 11/2000 |

* cited by examiner

Primary Examiner—Dang Dinh Le
(74) Attorney, Agent, or Firm—Law Offices of David G. Posz (57) ABSTRACT

A brushless motor includes a motor holder and a case connected thereto. A ventilation chamber is defined between the motor holder and the case. The ventilation chamber includes an air inlet portion, an air outlet portion and water draining portions. The air inlet portion is in communication with the atmosphere. The air outlet portion is in communication with a stator. The water draining portions drain water introduced into the ventilation chamber out of the motor. The motor provides a flow of cooling air passing through the ventilation chamber toward the stator for cooling heat generated during rotation of a rotor. The motor holder and the case have guide ribs arranged in the ventilation chamber to define an air passage for guiding the cooling air from the air inlet portion to the air outlet portion. The water draining portions are located outside of the air passage.

14 Claims, 5 Drawing Sheets

BRUSHLESS MOTOR HAVING WATER DRAINING PORTION

CROSS REFERENCE TO RELATED APPLICATION

This application is based on and incorporates herein by reference Japanese Patent Application No. 2000-175152 filed on Jun. 12, 2000.

BACKGROUND OF THE INVENTION

1. Field of the Invention

The present invention relates to a brushless motor used as a blower motor of a vehicle air conditioning system.

2. Description of Related Art

One type of previously proposed brushless motor used as a blower motor of a vehicle air conditioning system includes a stator, a rotor and a circuit board. The stator is secured to one side of a motor.holder. The circuit board is secured to the other side of the motor holder and includes an excitation circuit for supplying exciting current to the stator. The circuit boar is covered with a case connected to the motor holder. When the exciting current is supplied to the stator, the rotor is rotated to rotate a fan to blow air.

During the operation of the brushless motor, excessively high internal temperature of the motor causes the exciting current to be reduced, leading to a reduction in an output power of the motor and also causes failure of electronic components. Thus, in the previously proposed brushless motor, a heat source (e.g., the stator or the elements on the circuit board) located inside of the motor is cooled with cooling air during the operation of the motor. However, in this case, during rain, car washing or the like, water droplets can be drawn into the interior of the motor along with the cooling air. Some such motors have a structure that restrains the water droplets from being drawn into the interior of the motor.

Figure 6:
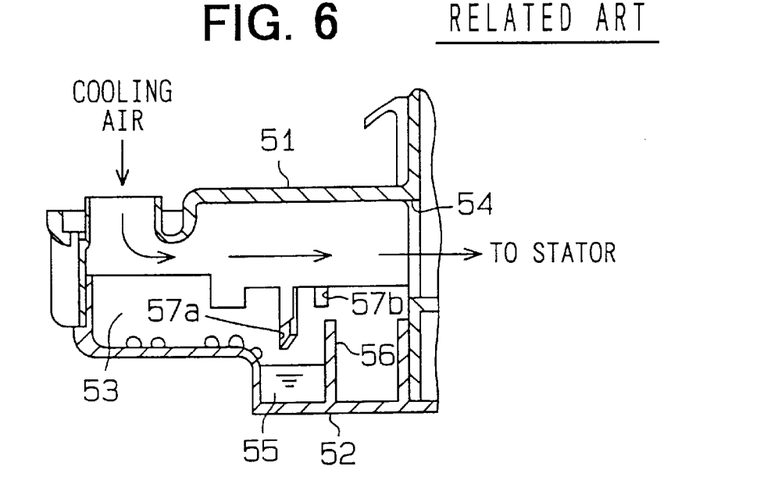
FIG. 6 is a partial cross-sectional view of a previously proposed brushless motor, showing ventilation chamber.
Figure 7:
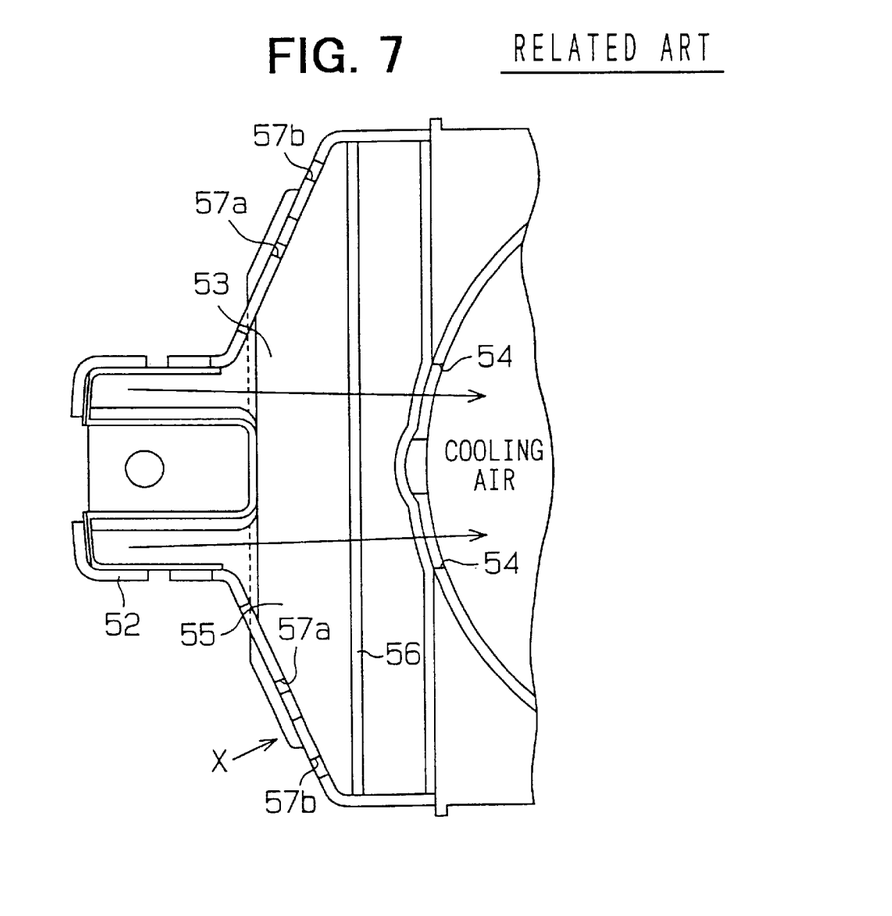
FIG. 7 is a plan view of the previously proposed brushless showing the ventilation chamber.

Specifically, with reference to FIG. 6, in one previously proposed brushless motor, a ventilation chamber 53 is defined between a motor holder 51 and a base case 52 connected thereto. Cooling air is drawn into an interior (stator side) of the motor through the ventilation chamber 53 and a guide hole 54. With this cooling air, the heat source located in the interior of the motor is cooled. Furthermore, as shown in FIGS. 6 and 7, a water reservoir 55 for accumulating the water droplets is formed in the ventilation chamber 53. In the water reservoir 55, a side wall 56 protrudes from a base of the base case 52. The water droplets drawn along the cooling air are accumulated within the water reservoir 55, so that the water droplets are not further drawn toward the interior of the motor.

Figure 8:
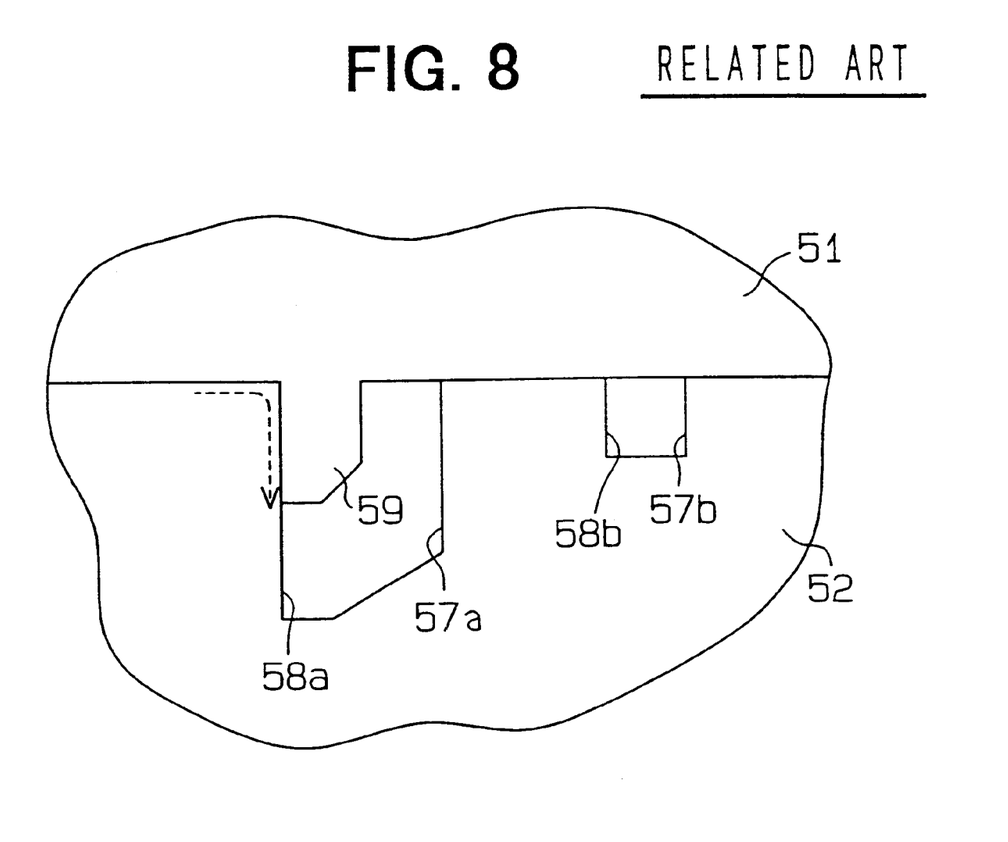
FIG. 8 is a enlarged view taken in a direction of an arrow X in FIG. 7.

In this motor, the motor holder 51 is not in sealed contact with the base case 52. Rather, the motor holder 51 simply abuts against the base case 52, allowing the water to flow through the contact surface between the motor holder 51 and the base case 52. Thus, the water can penetrate into the interior (stator side) of the motor through the contact surface between the motor holder 51 and the base case 52. However, as disclosed in Japanese Patent Application No. 11-121489, in the previously proposed brushless motor that is shown in FIGS. 6 to 8, water-flow interrupting holes (water draining portions.) 57a and 57b are provided in the connection or contact surface between the motor holder 51 and the base case 52 to restrain the penetration of the water into the interior of the motor. With reference to FIG. 8, notches 58a and 58b are formed in the base case 52. A water-flow interrupting hole 57a is formed by the notch 58a and a lower side of the motor holder 51, and a water-flow interrupting hole 57b is formed by the notch 58b and the side of the motor holder 51. In the water-flow interrupting hole 57a, a projection 59 projects from the side of the motor holder 51 to contacts, the notch 58a of the base case 52. With this arrangement, the water droplets penetrating the connection between the motor holder 51 and the base case 52 are directed downward, as indicated with an arrow in FIG. 8. The projection 59 is not entirely, continuously engaged with the notch 58a. In other words, a base end of the projection 59 is spaced from a base of the notch 58a. As a result, the water guided downward in the water-flow interrupting hole 57a is not guided upward in the water-flow interrupting hole 57a to further penetrate through the connection between the motor holder 51 and the base case 52. Similarly, in the water-flow interrupting hole 57b, the water is guided downward and does not further penetrate through the connection between the motor holder 51 and the base case 52. Thus, the water-flow interrupting holes 57a and 57b in the connection between the motor holder 51 and the base case 52 cause the water droplets to drop therein by gravity.

In the ventilation chamber 53, the cooling air flows toward the stator side. However, in the case of the brushless motor having the water-flow interrupting holes 57a and 57b, a portion of the cooling air leaks from the ventilation chamber 53 through the water-flow interrupting holes 57a and 57b. If the brushless motor is located near legs of a vehicle occupant in a vehicle cabin, the leaked cooling air may cause an unpleasant sensation to the vehicle occupant.

SUMMARY OF THE INVENTION

The present invention addresses the above disadvantages. Thus, it is an objective of the present invention to provide a brushless motor that includes a water draining portion for draining water out of the motor and effectively reduces or restrains leakage of cooling air through the water draining portion.

To achieve the objective of the present invention, there is provided a brushless motor including a motor holder and a case connected thereto. The motor holder includes a stator secured thereto. The stator rotatably supports a rotor. The motor holder also has a circuit board connected thereto. The circuit board has an excitation circuit for supplying exciting current to the stator. The case covers the circuit board and defines a ventilation chamber in cooperation with the motor holder. The ventilation chamber, includes an air inlet portion, an air outlet portion and a water draining portion. The air inlet portion is in communication with an atmosphere. The air outlet portion is in communication with the stator. The water draining portion drains water introduced into the ventilation chamber out of the brushless motor. The brushless motor provides a flow of cooling air passing through the ventilation chamber via the air inlet portion and the air outlet portion toward the stator for cooling heat generated during rotation of the rotor. At least one of the motor holder and the case has one or more guide ribs arranged in the ventilation chamber to define an air passage for guiding the cooling air from the air inlet portion to the air outlet portion. The water draining portion is located outside of the air passage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
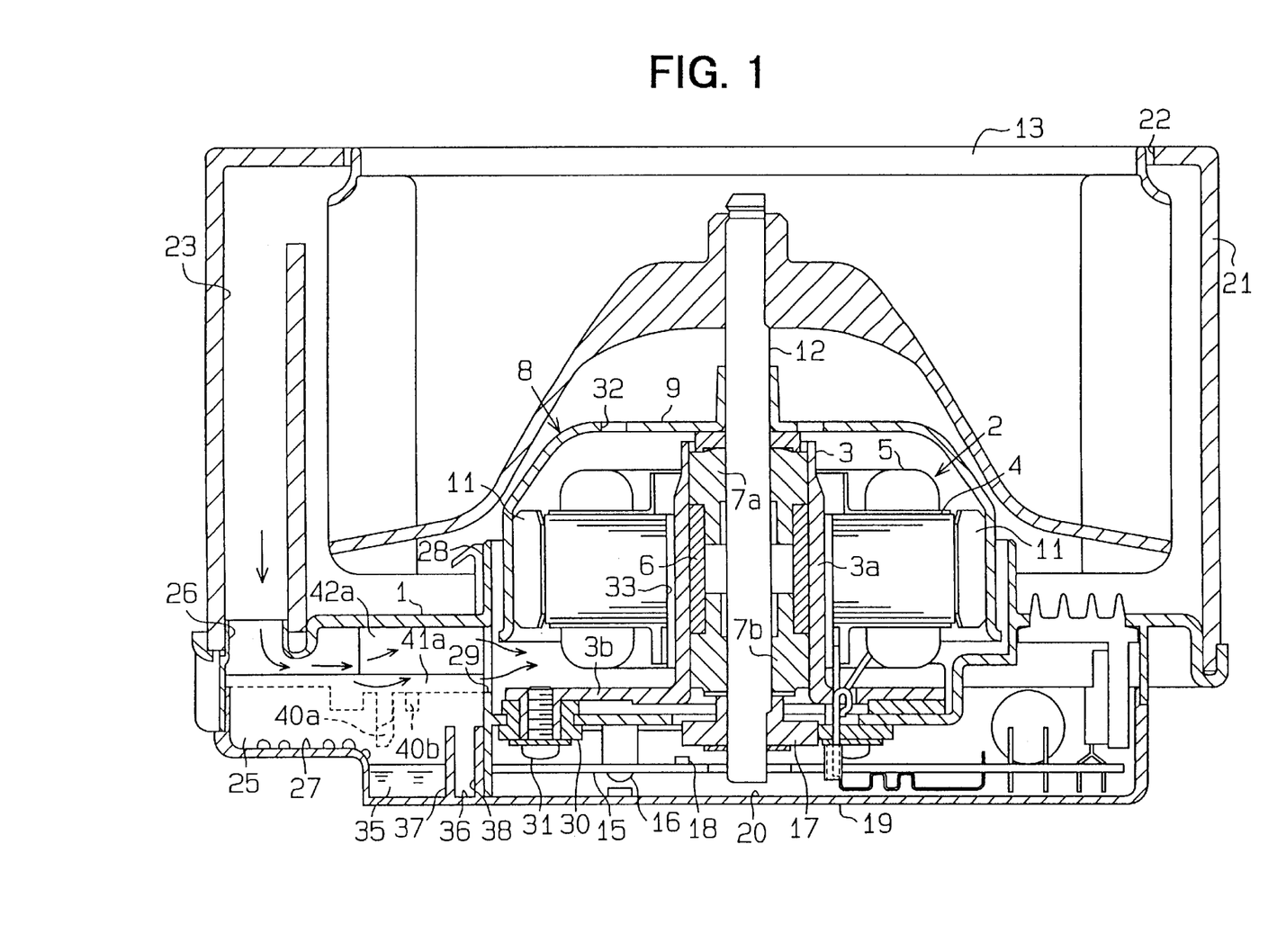
FIG. 1 is a cross-sectional view of a brushless motor according to an embodiment of the present invention.

With reference to FIG. 1, a brushless motor according to the embodiment includes a motor holder 1 made of a synthetic resin material. A stator 2 is securely connected to the motor holder 1. The stator 2 includes a center piece 3, a laminated core 4 and coil windings 5 wound around the core 4.

The center piece 3 is made of a heat conductive metal material and includes a cylindrical portion 3a and a protruding portion 3b that protrudes radially outwardly from the cylindrical portion 3a. A cylindrical holder bearing 6 is securely press fitted to an inner peripheral surface of the cylindrical portion 3a at an axially middle part thereof. Furthermore, an upper bearing 7a and a lower bearing 7b are secured within a top part and a bottom part of the cylindrical portion 3a, respectively.

A rotor 8 is rotatably supported by the stator 2. The rotor 8 include a yoke 9, a plurality of magnets 11 secured to an inner peripheral surface of the yoke 9, and an output shaft 12 press fitted within the yoke 9 at the center thereof. The output shaft 12 is rotatably supported by the upper and lower bearings 7a and 7b at the center of the center piece 3. A fan 13 is secured to a distal end of the output shaft 12.

A circuit board 15 is secured to a bottom surface of the motor holder 1 with one or more screws 16. Various elements that constitute an excitation circuit are mounted on the circuit board 15. When exciting current is applied to the windings 5 from the excitation circuit, the rotor 8 is rotated, and the output shaft 12 is also rotated along with the rotor 8. Thus, when the exciting current is applied to the windings 5, the fan 13 is rotated together with the output shaft 12 to generate a flow of the air.

A disk-like sensor magnet 17 is fitted around a lower end of the output shaft 12. A Hall element 18 is located on the circuit board 15 near an outer peripheral region of the sensor magnet 17. A rotational angle of the rotor 8 is determined based on a magnetic flux of the sensor magnet 17 measured with the Hall element 18. The excitation circuit controls the exciting current based on the rotational angle of the rotor 8.

A base case 19 that covers the circuit boar 15 is connected to the motor holder 1. The base case 19 is made of a synthetic resin material similar to that of the motor holder 1. Furthermore, the base case 19 is formed in a dish shape having a peripheral wall that protrudes upwardly from a base of the base case 19. A wall thickness of the base case 19 is thinner than that of the motor holder 1 for weight reduction purpose. The circuit board 15 that has the various elements is received within a circuit element housing portion 20 defined between the motor holder 1 and the base case 19.

A blower case 21 is connected to the motor holder 1 to surround the fan 13. At a top end of the blower case 21, there is formed an opening 22 that is communicated with an intake duct (not shown) for introducing the air from a vehicle exterior or a vehicle.interior. On a peripheral wall of, the blower case 21, there is provided an air outlet opening (not shown) that is communicated with an air duct. Based on the rotation of the fan 13, the air taken from the opening 22 flows swirlingly within the blower.case 21 toward the outlet opening (not shown). Then, the air is guided from the outlet opening to the vehicle interior or to an air conditioning device through the air duct.

A separation duct 23 is formed within the blower case 21 to separate and guide a portion of the air taken from the opening 22. The separation duct 23 is communicated with a duct ventilation chamber 25 defined between the motor holder 1 and the base case 19. Specifically, a lower end of the separation duct 23 is connected to a vertically extending inlet hole (air inlet portion) 26 provided in the duct ventilation chamber 25. The inlet hole 26 is, in turn, connected to laterally extending communication holes 27 located within the duct ventilation chamber 25.

The motor holder 1 has a cylindrical portion 28 that is centrally located in the motor holder 1 to receive a base of the stator 2 and a base of the rotor 8. Guide holes (air outlet portion) 29 are provided in a peripheral wall of the cylindrical portion 28. The duct ventilation chamber 25 is a space defined at upstream of the guide holes 29 between the motor holder 1 and the base case 19. The air or cooling air taken through the separation duct 23 passes through the duct ventilation chamber 25 and the guide holes 29 toward an interior of the cylindrical portion 28 (toward the stator 2 side).

The protruding portion 3b of the center piece 3 extends over a laterally extending base segment of the cylindrical portion 28 toward the guide holes 29. The protruding portion 3b is connected to the base segment of the cylindrical portion 28 with screw(s) 31 via a rubber cushion 30. Thus, the center piece 3 is secured to the motor holder 1. A plurality of vent holes 32 are formed on a top of the yoke 9 to communicate the inside of the yoke 9 to the outside of the yoke 9. Furthermore, air holes 33 are formed between the center piece 3 and the core 4. The cooling air passed through the guide holes 29 flows through the air holes 33 and also through the vent holes 32.

In the duct ventilation chamber 25, a recessed water reservoir 35 is formed on a stator 2 side of the communication holes 27. A water draining channel 36 is formed on a guide hole 29 side of the water reservoir 35. The water reservoir 35 and the water draining channel 36 restrain the water droplets from entering into the motor interior.

A detailed structure of the duct ventilation chamber 25 will be described with reference to FIGS. 1 to 3.

Figure 2:
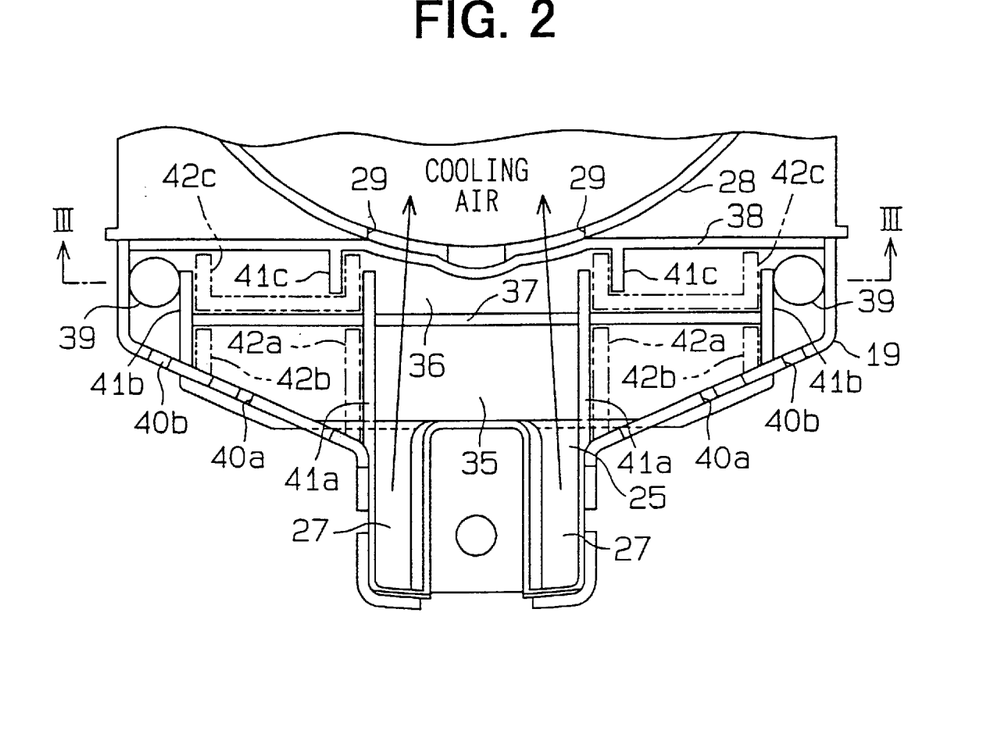
FIG. 2 is a partial plan view of the brushless motor according to the embodiment, showing a duct ventilation chamber.

As shown in FIGS. 1 and 2, in the duct ventilation chamber 25, a rib 37 protrudes from the base of the base case 19 to form a side wall of the water reservoir 35. Also, a rib 38 protrudes from the base of the base case 19 on the stator 2 side of the rib 37. The water draining channel 36 is defined between these two ribs 37 and 38. As shown in FIGS. 2 and 3, a water draining hole 39 is formed at each end of the water draining channel 36 to penetrate through the base case 19.

As shown in FIGS. 1 and 2, water-flow interrupting holes 40a and 40b are formed at a connection between the motor holder 1 and the base case 19. Shapes of the water-flow interrupting holes 40a and 40b are substantially the same as those of the water-flow interrupting holes 57a and 57b shown in FIG. 8.

In the present embodiment, the water draining holes 39 and the water-flow interrupting holes 40a and 40b act as water draining portions of the present invention. In the duct ventilation chamber 25 having these water draining portions 39, 40a and 40b, guide ribs 41a–41c and 42a–42c are formed in the base case 19 and the motor holder 1, respectively, to guide the cooling air from the inlet hole 26 toward the stator 2 side. Dot-dot dash lines shown in FIG. 2 depict the guide ribs 42a–42c of the motor holder 1. The guide ribs 42a–42c are positioned adjacent to the guide ribs 41a–41c of the base case 19, respectively. Furthermore, as shown in FIG. 3, the guide ribs 41a–41c protrude from an inner surface of the base case 19, and the guide ribs 42a–42c protrude from an inner surface of the motor holder 1.

Figure 3:
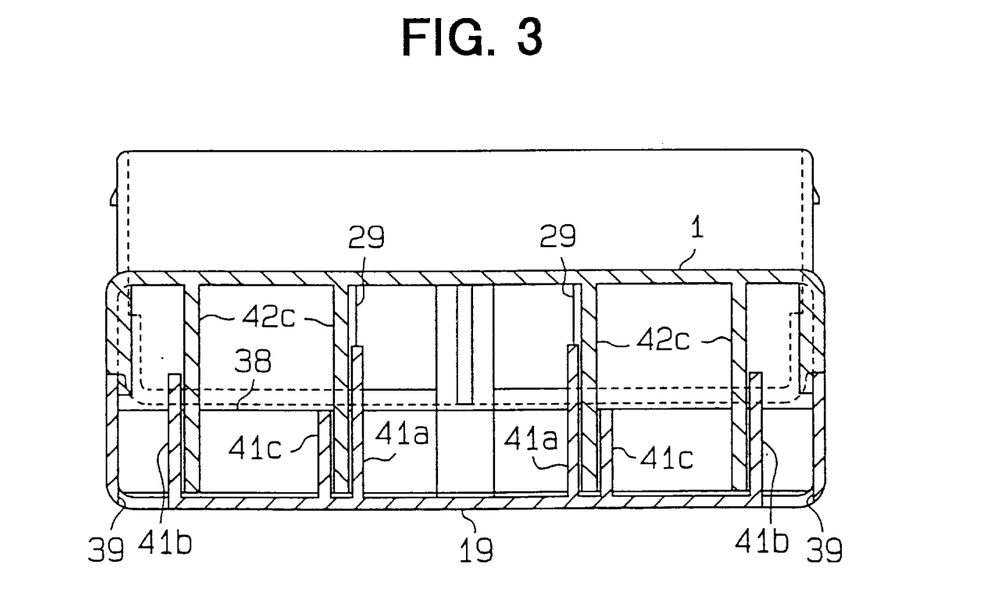
FIG. 3 is a cross-sectional view taken along line III—III in FIG. 2.

As shown in FIGS. 2 and 3, in the duct ventilation chamber 25, two communication holes 27 and two guide holes 29 are provided. The communication holes 27 extend toward the corresponding guide holes 29. Each guide rib 41a extends along a line that connects an outer side surface of each communication hole 27 and an outer end of the corresponding guide hole 29. That is, each guide rib 41a extends from the inlet hole 26 side toward the stator 2 side to effectively guide the cooling air from the inlet hole 26 to the guide holes 29. The guide ribs 41b are provided at the opposing ends of the rib 37 to extend parallel to the guide ribs 41a. Each guide rib 41c extends from the rib 38 from the stator 2 side toward the inlet hole 26 side near the corresponding guide hole 29. Ends of these guide ribs 41a–41c are spaced from the opposed rib 37 or 38 within the draining channel 36. More specifically, a space is formed between the ends of the guide ribs 41a and 41b and a side surface of the rib 38, and a space is formed between the ends of the guide ribs 41c and a side surface of the rib 37. These spaces allow the water to run through the spaces within the draining channel 36 toward the draining holes 39.

In the water draining channel 36, the guide ribs 42c formed on the motor holder 1 has a horseshoe-shaped cross section. One lateral end of each guide rib 42c is held between the guide rib 41a and the guide rib 41c, the other lateral end of each guide rib 42c overlaps with an inner side of the guide rib 41b. As shown in FIG. 3, a small space (slit passage) is provided between a lower end of each rib 42c and the base of the base case 19. Since the cross-section of the rib 42c is horseshoe-shaped, the small space provides a bent passage for the water. The water that has overflowed from or has passed over the water reservoir 35 penetrates through the small spaces and is drained through the water draining holes 39. Each guide rib 42a extends parallel to the corresponding guide rib 41a in such a manner that the guide rib 42a overlaps with an outer side surface of the corresponding guide rib 41a. Furthermore, each guide rib 42b extends parallel to the corresponding guide rib 41b in such a manner that the guide rib 42b overlaps with an inner side surface of the corresponding guide rib 41b.

Inner side surfaces of the guide ribs 41a and inner side surfaces of the guide ribs 42a and 42c define an air passage within the ventilation chamber 25 and substantially prohibit the cooling air from passing from the air passage to the draining holes 39 and the water-flow interrupting holes 40a and 40b. The cooling air is introduced into the interior of the motor through the air passage defined within the ventilation chamber 25 through the guide holes 29. Furthermore, the guide ribs 41a–41c and the guide ribs 42a–42c are provided in the base case 19 and the motor holder 1, respectively, in such a manner that the guide ribs 41a–41c and the guide ribs 42a–42c overlap each other to form a maze structure. Thus, leakage of the cooling air through the water draining holes 39 and the water-flow interrupting holes 40a and 40b is further restrained.

Operation of the brushless motor according to the present embodiment will be described below.

First, when the exciting current is applied to the coil windings 5 from the excitation circuit on the circuit board 15, the rotor 8 is rotated together with the fan 13. When the fan 13 is rotated, the air introduced through the intake duct is sent to the air duct through the blower case 21. During this process, a portion of the air is guided into the separation duct 23 and is introduced into the duct ventilation chamber 25 as the cooling air. In the duct ventilation chamber 25, the cooling air is effectively guided to the guide holes 29 by the guide ribs 41a–41c and 42a–42c and is then introduced into the interior of the cylindrical portion 28 of the motor holder 1. Then, the cooling air hits the protruding portion 3b of the center piece 3 to cool the center piece 3. Furthermore, the cooling air is also introduced inside of the yoke 9 to cool the coil windings 5.

The cooling air that has cooled the windings 5 is vented out from the yoke 9 through the vent holes 32. During this stage, the cooling air is vented through the vent holes 32 after passing through a space defined between each magnet 11 and the core 4 or through the air holes 33 defined between the core 4 and the center piece 3. Furthermore, a portion of the cooling air introduced into the interior of the cylindrical portion 28 is vented out from the cylindrical portion 28 through a space defined between the Yoke 9 and the cylindrical portion 28 while cooling an outer peripheral surface of the yoke 9.

During rain, car washing or the like, the water droplets can be drawn into the interior of the blower case 21 along with the air. These water droplets can adhere to an inner wall of the separation duct 23. The water droplets on the inner wall of the separation duct 23 flow downward and then flow along a base surface of each communication hole 27 of the duct ventilation chamber 25 into the water reservoir 35. When dry air is introduced into the separation duct 23 after the rain, the car washing or the like, the water accumulated in the water reservoir 35 is evaporated. Also, the water that has passed over the water reservoir 35 is drained out from the motor through the water draining channel 36 and the water draining holes 39.

Although the majority of the water droplets falling along the inner wall of the separation duct 23 are guided into the water reservoir 35, some of the water droplets flow along a connection between the separation duct 23 and the motor holder 1 and also through the connection between the motor holder 1 and the base case 19. That is, the motor holder 1 is not in sealed contact with the base case 19. Rather, the motor holder 1 simply abuts against the base case 19, allowing the water to flow through the contact surface between the motor holder 1 and the base case 19. However, because of the water-flow interrupting holes 40a and 40b, the water droplets that have reached the water-flow interrupting holes 40a and 40b along the contact surface between the motor holder 1 and the base case 19 fall, stay or evaporate at the water-flow interrupting holes 40a and 40b. Therefore, intrusion of the water, for example, into the circuit element housing portion 20 is advantageously restrained.

As described above, the present embodiment provides the following advantages.

(1) The water draining holes 39 as well as the water-flow interrupting holes 40a and 40b are provided in the duct ventilation chamber 25 to drain the water droplets from the duct ventilation chamber 25. Thus, the intrusion of the water droplets into the stator 2 side or the circuit element housing portion 20 that receives the circuit elements can be restrained. Furthermore, in the duct ventilation chamber 25, the guide ribs 41a–41c and 42a–42c are provided to guide the cooling air toward the stator 2 side, so that the flow of the cooling air to the water draining holes 39 or the water-flow interrupting holes 40a, 40b can be restrained. That is, the brushless motor according to the present embodiment achieves a higher degree of water resistance for the circuit elements.with the provision of the water draining holes 39 and the water-flow interrupting holes 40a and 40b and restricts the leakage of the cooling air through the water draining holes 39 and the water-flow interrupting holes 40a and 40b. Thus, the brushless motor according to the present embodiment will not cause an unpleasant sensation to the vehicle occupant by the cooling air leaked through the water draining holes 39 and the water-flow interrupting holes 40a and 40b.

(2) The guide ribs 41a–41c and 42a–42c are provided in the base case 19 and the motor holder 1, respectively, so that the cooling air is more effectively guided to the stator 2 side. As a result, the leakage of the cooling air can be restrained.

(3) The guide ribs 42a–42c of the motor holder 1 are overlapped with the guide ribs 41a–41c of the lower case 19 in such a manner that the guide ribs 42a–42c and the guide ribs 41a–41c form the maze structure. Thus, the leakage of the cooling air can be more effectively restrained.

The present embodiment can be modified as follows.

Figure 4:
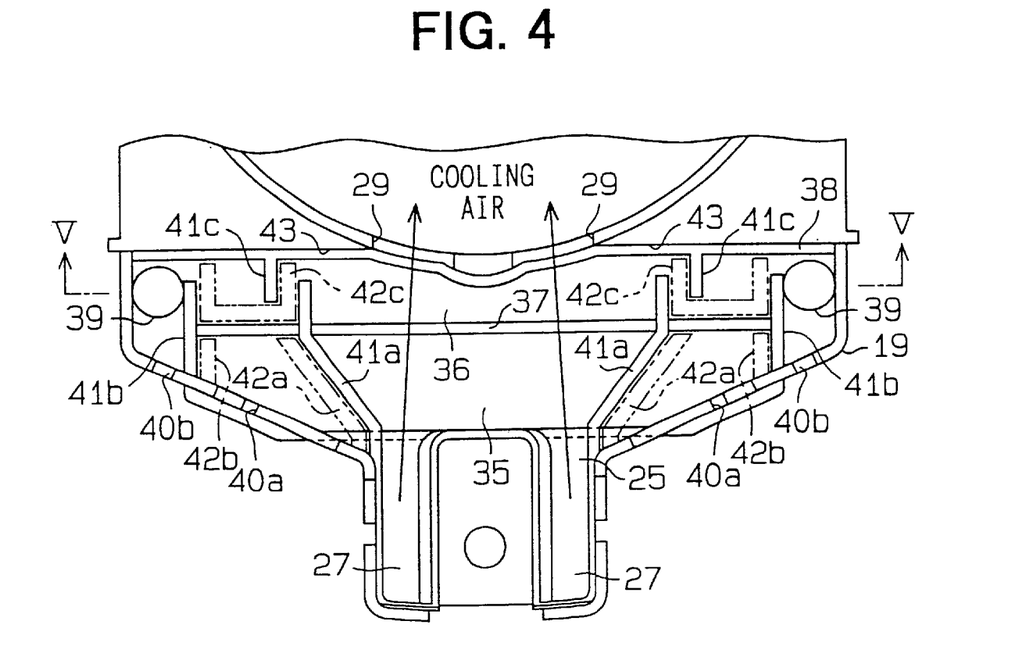
FIG. 4 is a partial plan view showing a modification of the duct ventilation chamber according to the embodiment.
Figure 5:
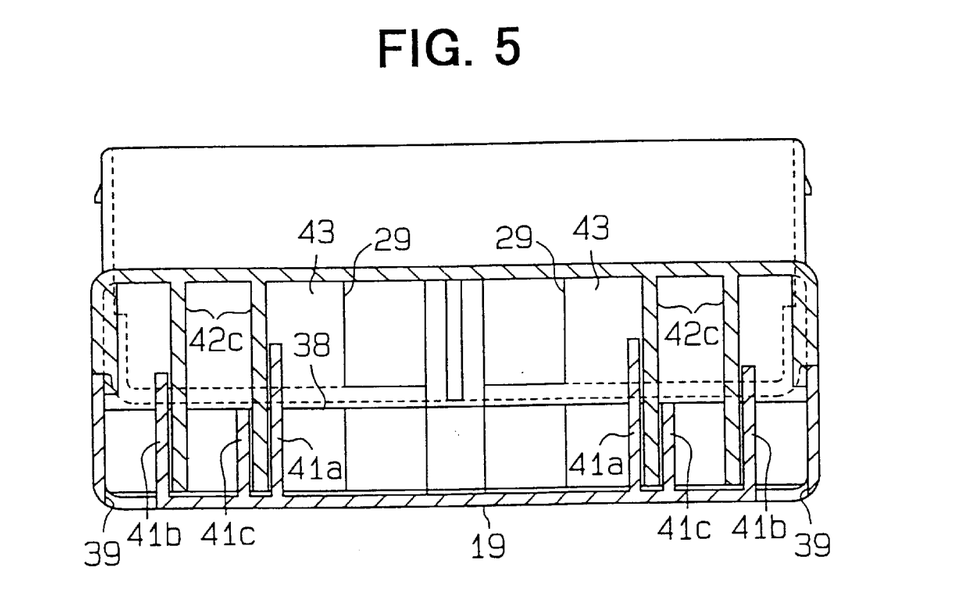
FIG. 5 is a cross-sectional view taken along line V—V in FIG. 4.

The guide ribs 41a–41c and 42a–42c in the duct ventilation chamber 25 can be arranged as shown in FIGS. 4 and 5. More specifically, the air passage defined by the guide ribs 41a, 42a and 42c within the duct ventilation chamber 25 has substantially the same width at both an upstream side and a downstream side thereof, as shown in FIGS. 2 and 3. That is, each guide rib 41a extends generally parallel to a flow direction of the cooling air passing through the air passage within the duct ventilation chamber 25. Contrary to this, with reference to FIGS. 4 and 5, a space between the two guide ribs 41a in the water reservoir 35 gradually increases from the upstream side toward the downstream side. Furthermore, each guide rib 42a extends parallel to the corresponding guide rib 41a to overlap with the guide rib 41a on an outer side thereof. That is, the air passage defined by the guide ribs 41a and 42a has an increasing width that increases from the upstream side toward the downstream side. In this case, a pressure of the cooling air applied on wall surfaces of the guide ribs 41a and 42a is reduced, so that water droplets on the wall surfaces of the guide ribs 41a and 42a are less likely to traverse along the wall surfaces of the guide ribs 41a and 42a. That is, the water droplets are less likely to stay on the wall surfaces of the guide ribs 41a and 42a and are more effectively accumulated in the water reservoir 35. A distal end of each guide rib 41a opposes a resistant wall 43 arranged outward of the corresponding guide hole 29. Thus, even if the water droplets have traversed the wall surface of the guide rib 41a, the resistant wall 43 can effectively restrain the water droplets from entering into the interior of the motor. Thus, the degree of water resistance of the brushless motor can be further improved.

In the above embodiment, both the base case 19 and motor holder 1 have the guide ribs 41a–41c and 42a–42c, respectively. However, only one of the base case 19 and motor holder 1 can have the guide rib(s). Furthermore, the shapes and the number of the guide ribs are not limited to those described above.

In the above embodiment, the invention is applied to the brushless motor having the duct ventilation chamber 25 provided with both the water draining holes 39 and the water-flow interrupting holes 40a and 40b. However, the present invention can be applied to the brushless motor having the duct ventilation chamber 25 provided only with either the water draining holes 39 or the water-flow interrupting holes 40a and 40b.

Additional advantages and modifications will readily occur to those skilled in the art. The invention in its broader terms is therefore, not limited to the specific details, representative apparatus, and illustrative examples shown and described.

What is claimed is:

1. A brushless motor comprising:

a motor holder including a stator secured thereto, said stator rotatably supporting a rotor, said motor holder having a circuit board connected thereto, said circuit board having an excitation circuit for supplying exciting current to said stator; and a case connected to said motor holder, said case covering said circuit board and defining a ventilation chamber in cooperation with said motor holder, said ventilation chamber including an air inlet portion, an air outlet portion and a water draining portion, said air inlet portion being in communication with an atmosphere, said air outlet portion being in communication with said stator, said water draining portion draining water introduced into said ventilation chamber out of said brushless motor, said brushless motor providing a flow of cooling air passing through said ventilation chamber via said air inlet portion and said air outlet portion toward said stator for cooling heat generated during rotation of said rotor, said motor holder having one or more guide ribs arranged in said ventilation chamber, said case having one or more guide ribs arranged in said ventilation chamber, at least a portion of at least one of said one or more guide ribs of said motor holder being placed adjacent to and extending substantially parallel to at least a portion of at least one of said one or more guide ribs of said case to define an air passage for guiding said cooling air from said air inlet portion to said air outlet portion, said water draining portion being located outside of said air passage.

2. A brushless motor according to claim 1, wherein at least one of said one or more guide ribs of said motor holder and at least one of said, one or more guide ribs of said case at least partially overlap each other to form a maze structure.

3. A brushless motor according to claim 1, wherein at least a portion of said air passage has a continuously increasing width that increases continuously from an upstream side of said air passage toward a downstream side of said air passage.

4. A brushless motor according to claim 1, wherein:

said ventilation chamber includes a water reservoir and a water draining channel;

said water reservoir being located within said air passage to accumulate said water introduced into said ventilation chamber;

said water draining portion includes a water draining hole; and said draining channel extends from said air passage to said draining hole to drain said water from said air passage through said draining hole.

5. A brushless motor according to claim 4, wherein at least one of said one or more guide ribs of said motor holder and at least one of said one or more guide ribs of said case cooperate together to define a slit passage in said draining channel between said motor holder and said case, said slit passage allowing fluid communication between said air passage and said draining hole, said slit passage having at least one bent portion between said air passage and said water draining hole.

6. A brushless motor according to claim 5, wherein said water draining portion further includes a water-flow interrupting hole formed at a connection between said motor holder and said case for draining said water present at said connection, said water-flow interrupting hole penetrates through at least one of a wall of said motor holder and a wall of said case to directly communicate said ventilation chamber to said atmosphere.

7. A brushless motor according to claim 1, wherein said water draining portion includes a water-flow interrupting hole formed at a connection between said motor holder and said case for draining said water present in said connection, said water-flow interrupting hole penetrates through at least one of a wall of said motor holder and a wall of said case to directly communicate said ventilation chamber to said atmosphere.

8. A brushless motor according to claim 1, wherein said air passage is generally straight between said air inlet portion and said air outlet portion.

9. A brushless motor according to claim 1, wherein said air passage provides an unobstructed space between said air inlet portion and said air outlet portion.

10. A brushless motor according to claim 1, wherein said one or more guide ribs of said motor holder and said one or more guide ribs of said case extend generally in a vertical direction.

11. A brushless motor comprising:

a motor holder including a stator secured thereto, said stator rotatably supporting a rotor, said motor holder having a circuit board connected thereto, said circuit board having an excitation circuit for supplying exciting current to said stator; and a case connected to said motor holder, said case covering said circuit board and defining a ventilation chamber in cooperation with said motor holder, said ventilation chamber including an air inlet portion, an air outlet portion and a water draining portion, said air inlet portion being in communication with an atmosphere, said air outlet portion being in communication with said stator, said water draining portion draining water introduced into said ventilation chamber out of said brushless motor, said brushless motor providing a flow of cooling air passing through said ventilation chamber via said air inlet portion and said air outlet portion toward said stator for cooling heat generated during rotation of said rotor, said motor holder having one or more guide ribs arranged in said ventilation chamber, said case having two or more guide ribs arranged in said ventilation chamber, at least a portion of at least one of said one or more guide ribs of said motor holder being placed between and extending substantially parallel to at least a portion of an adjacent one of said guide ribs of said case and at least a portion of another adjacent one of said guide ribs of said case to define an air passage for guiding said cooling air from said air inlet portion to said air outlet portion.

12. A brushless motor according to claim 11, wherein a slit passage is defined between a base wall of said case and a vertical end of said at least one of said one or more guide ribs of said motor holder.

13. A brushless motor according to claim 12, wherein:

said water draining portion includes a water draining hole, which penetrates through said base wall of said case and is thus directly communicated with an exterior of said brushless motor; and said slit passage communicates between said air passage and said water draining hole.

14. A brushless motor comprising:

a motor holder including a stator secured thereto, said stator rotatably supporting a rotor, said motor holder having a circuit board connected thereto, said circuit board having an excitation circuit for supplying exciting current to said stator; and a case connected to said motor holder, said case covering said circuit board and defining a ventilation chamber in cooperation with said motor holder, said ventilation chamber including an air inlet portion, an air outlet portion and a water draining portion, said air inlet portion being in communication with an atmosphere, said air outlet portion being in communication with said stator, said water draining portion draining water introduced into said ventilation chamber out of said brushless motor, said brushless motor providing a flow of cooling air passing through said ventilation chamber via said air inlet portion and said air outlet portion toward said stator for cooling heat generated during rotation of said rotor, at least one of said motor holder and said case having one or more guide ribs arranged in said ventilation chamber to define an air passage for guiding said cooling air from said air inlet portion to said air outlet portion, said one or more guide ribs extending generally in a vertical direction, said water draining portion being located outside of said air passage.

* * * * *